US010627811B2

United States Patent
Golgiri et al.

(10) Patent No.: US 10,627,811 B2
(45) Date of Patent: Apr. 21, 2020

(54) AUDIO ALERTS FOR REMOTE PARK-ASSIST TETHERING

(71) Applicant: Ford Global Technologies, LLC, Dearborn, MI (US)

(72) Inventors: Hamid M. Golgiri, Dearborn, MI (US); Erick Michael Lavoie, Dearborn, MI (US); Vivekanandh Elangovan, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 70 days.

(21) Appl. No.: 15/805,838

(22) Filed: Nov. 7, 2017

(65) Prior Publication Data
US 2019/0137990 A1 May 9, 2019

(51) Int. Cl.
*G05D 1/00* (2006.01)
*B62D 15/02* (2006.01)
*G08G 1/16* (2006.01)
*B60W 30/06* (2006.01)

(52) U.S. Cl.
CPC ............ *G05D 1/005* (2013.01); *B60W 30/06* (2013.01); *B62D 15/0285* (2013.01); *G08G 1/168* (2013.01)

(58) Field of Classification Search
None
See application file for complete search history.

(56) References Cited

U.S. PATENT DOCUMENTS

| | | | |
|---|---|---|---|
| 5,959,724 | A | 9/1999 | Izumi |
| 6,275,754 | B1 | 8/2001 | Shimizu |
| 6,356,828 | B1 | 3/2002 | Shimizu |
| 6,452,617 | B1 | 9/2002 | Bates |
| 6,476,730 | B2 | 11/2002 | Kakinami |
| 6,477,260 | B1 | 11/2002 | Shimomura |
| 6,657,555 | B2 | 12/2003 | Shimizu |
| 6,683,539 | B2 | 1/2004 | Trajkovic |
| 6,724,322 | B2 | 4/2004 | Tang |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Lail A Kleinman
(74) *Attorney, Agent, or Firm* — Frank Lollo; Eversheds Sutherland (US) LLP

(57) ABSTRACT

Method and apparatus are disclosed for audio alerts for remote park-assist tethering. An example vehicle includes an exterior surface, a speaker, a communication node for wireless communication with a mobile device, an autonomy unit for remote parking, and a controller. The controller is to receive, via the communication node, an instruction from the mobile device to perform the remote parking and emit an alert, via the speaker, responsive to determining the mobile device is beyond a threshold range from the exterior surface while sending the instruction.

19 Claims, 6 Drawing Sheets

(56) References Cited

U.S. PATENT DOCUMENTS

| | | | |
|---|---|---|---|
| 6,744,364 B2 * | 6/2004 | Wathen | G07C 9/00182 340/426.13 |
| 6,768,420 B2 | 7/2004 | McCarthy | |
| 6,801,855 B1 | 10/2004 | Walters | |
| 6,850,844 B1 | 1/2005 | Walters | |
| 6,850,148 B2 | 2/2005 | Masudaya | |
| 6,927,685 B2 | 8/2005 | Wathen | |
| 6,997,048 B2 | 2/2006 | Komatsu | |
| 7,042,332 B2 | 5/2006 | Takamura | |
| 7,123,167 B2 | 10/2006 | Staniszewski | |
| 7,307,655 B1 | 12/2007 | Okamoto | |
| 7,663,508 B2 | 2/2010 | Teshima et al. | |
| 7,737,866 B2 | 6/2010 | Wu | |
| 7,813,844 B2 | 10/2010 | Gensler | |
| 7,825,828 B2 | 11/2010 | Watanabe | |
| 7,834,778 B2 | 11/2010 | Browne | |
| 7,847,709 B2 | 12/2010 | McCall | |
| 7,850,078 B2 | 12/2010 | Christenson | |
| 7,924,483 B2 | 4/2011 | Smith | |
| 8,035,503 B2 | 10/2011 | Partin | |
| 8,054,169 B2 | 11/2011 | Bettecken | |
| 8,098,146 B2 | 1/2012 | Petrucelli | |
| 8,126,450 B2 | 2/2012 | Howarter | |
| 8,164,628 B2 | 4/2012 | Stein | |
| 8,180,524 B2 | 5/2012 | Eguchi | |
| 8,180,547 B2 | 5/2012 | Prasad | |
| 8,224,313 B2 | 7/2012 | Howarter | |
| 8,229,645 B2 | 7/2012 | Lee | |
| 8,242,884 B2 | 8/2012 | Holcomb | |
| 8,335,598 B2 | 12/2012 | Dickerhoof | |
| 8,401,235 B2 | 3/2013 | Lee | |
| 8,493,236 B2 | 7/2013 | Boehme | |
| 8,538,408 B2 | 9/2013 | Howarter | |
| 8,542,130 B2 | 9/2013 | Lavoie | |
| 8,552,856 B2 | 10/2013 | McRae | |
| 8,587,681 B2 | 11/2013 | Guidash | |
| 8,594,616 B2 | 11/2013 | Gusikhin | |
| 8,599,043 B2 | 12/2013 | Kadowaki | |
| 8,618,945 B2 | 12/2013 | Furuta | |
| 8,645,015 B2 | 2/2014 | Oetiker | |
| 8,655,551 B2 | 2/2014 | Danz | |
| 8,692,773 B2 | 4/2014 | You | |
| 8,706,350 B2 | 4/2014 | Talty | |
| 8,725,315 B2 | 5/2014 | Talty | |
| 8,742,947 B2 | 6/2014 | Nakazono | |
| 8,744,684 B2 | 6/2014 | Hong | |
| 8,780,257 B2 | 7/2014 | Gidon | |
| 8,787,868 B2 | 7/2014 | Leblanc | |
| 8,825,262 B2 | 9/2014 | Lee | |
| 8,933,778 B2 | 1/2015 | Birkel | |
| 8,957,786 B2 | 2/2015 | Stempnik | |
| 8,994,548 B2 | 3/2015 | Gaboury et al. | |
| 8,995,914 B2 | 3/2015 | Nishidai | |
| 9,008,860 B2 | 4/2015 | Waldock | |
| 9,014,920 B1 | 4/2015 | Torres | |
| 9,078,200 B2 | 7/2015 | Wuergler | |
| 9,086,879 B2 | 7/2015 | Gautama | |
| 9,141,503 B1 | 9/2015 | Chen | |
| 9,147,065 B2 | 9/2015 | Lauer | |
| 9,154,920 B2 | 10/2015 | O'Brien | |
| 9,168,955 B2 | 10/2015 | Noh | |
| 9,193,387 B2 | 11/2015 | Auer | |
| 9,225,531 B2 | 12/2015 | Hachey | |
| 9,230,439 B2 | 1/2016 | Boulay | |
| 9,233,710 B2 | 1/2016 | Lavoie | |
| 9,273,966 B2 | 3/2016 | Bartels | |
| 9,275,208 B2 | 3/2016 | Protopapas | |
| 9,283,960 B1 | 3/2016 | Lavoie | |
| 9,286,803 B2 | 3/2016 | Tippelhofer | |
| 9,302,675 B2 | 4/2016 | Schilling | |
| 9,318,022 B2 | 4/2016 | Barth | |
| 9,379,567 B2 | 6/2016 | Kracker | |
| 9,381,859 B2 | 7/2016 | Nagata | |
| 9,429,657 B2 | 8/2016 | Sidhu | |
| 9,429,947 B1 | 8/2016 | Wengreen | |
| 9,454,251 B1 | 9/2016 | Guihot | |
| 9,469,247 B2 | 10/2016 | Juneja | |
| 9,493,187 B2 | 11/2016 | Pilutti | |
| 9,506,774 B2 | 11/2016 | Shutko | |
| 9,511,799 B2 | 12/2016 | Lavoie | |
| 9,522,675 B1 | 12/2016 | You | |
| 9,529,519 B2 | 12/2016 | Blumenberg | |
| 9,557,741 B1 | 1/2017 | Elie | |
| 9,563,990 B2 | 2/2017 | Khan | |
| 9,595,145 B2 | 3/2017 | Avery | |
| 9,598,051 B2 | 3/2017 | Okada | |
| 9,606,241 B2 | 3/2017 | Varoglu | |
| 9,616,923 B2 | 4/2017 | Lavoie | |
| 9,637,117 B1 | 5/2017 | Gusikhin | |
| 9,651,655 B2 | 5/2017 | Feldman | |
| 9,656,690 B2 | 5/2017 | Shen | |
| 9,666,040 B2 | 5/2017 | Flaherty | |
| 9,688,306 B2 | 6/2017 | McClain | |
| 9,701,280 B2 | 7/2017 | Schussmann | |
| 9,712,977 B2 | 7/2017 | Tu | |
| 9,715,816 B1 | 7/2017 | Adler | |
| 9,725,069 B2 | 8/2017 | Krishnan | |
| 9,731,714 B2 | 8/2017 | Kiriya | |
| 9,731,764 B2 | 8/2017 | Baek | |
| 9,754,173 B2 | 9/2017 | Kim | |
| 9,809,218 B2 | 11/2017 | Elie | |
| 9,811,085 B1 | 11/2017 | Hayes | |
| 9,842,444 B2 | 12/2017 | Van Wiemeersch | |
| 9,845,070 B2 | 12/2017 | Petel | |
| 9,846,431 B2 | 12/2017 | Petel | |
| 9,914,333 B2 | 3/2018 | Shank | |
| 9,921,743 B2 | 3/2018 | Bryant | |
| 9,946,255 B2 | 4/2018 | Matters | |
| 9,959,763 B2 | 5/2018 | Miller | |
| 9,971,130 B1 | 5/2018 | Lin | |
| 9,975,504 B2 | 5/2018 | Dalke | |
| 10,019,001 B2 | 7/2018 | Dang Van Nhan | |
| 10,032,276 B1 | 7/2018 | Liu | |
| 10,040,482 B1 | 8/2018 | Jung | |
| 10,043,076 B1 | 8/2018 | Zhang | |
| 10,131,347 B2 | 11/2018 | Kim | |
| 10,192,113 B1 | 1/2019 | Liu | |
| 10,246,055 B2 | 4/2019 | Farges | |
| 10,268,341 B2 | 4/2019 | Kocienda | |
| 2003/0060972 A1 | 3/2003 | Kakinami | |
| 2003/0098792 A1 | 5/2003 | Edwards | |
| 2003/0133027 A1 | 7/2003 | Itoh | |
| 2005/0030156 A1 | 2/2005 | Alfonso | |
| 2005/0068450 A1 | 3/2005 | Steinberg | |
| 2005/0099275 A1 | 5/2005 | Kamdar | |
| 2006/0010961 A1 | 1/2006 | Gibson | |
| 2006/0227010 A1 | 10/2006 | Berstis | |
| 2006/0235590 A1 | 10/2006 | Bolourchi | |
| 2007/0230944 A1 | 10/2007 | Georgiev | |
| 2008/0027591 A1 | 1/2008 | Lenser | |
| 2008/0154464 A1 | 6/2008 | Sasajima | |
| 2008/0154613 A1 | 6/2008 | Haulick | |
| 2008/0238643 A1 | 10/2008 | Malen | |
| 2008/0306683 A1 | 12/2008 | Ando | |
| 2009/0096753 A1 | 4/2009 | Lim | |
| 2009/0098907 A1 | 4/2009 | Huntzicker | |
| 2009/0115639 A1 | 5/2009 | Proefke et al. | |
| 2009/0125181 A1 | 5/2009 | Luke | |
| 2009/0125311 A1 | 5/2009 | Haulick | |
| 2009/0128315 A1 | 5/2009 | Griesser | |
| 2009/0146813 A1 | 6/2009 | Nuno | |
| 2009/0174574 A1 | 7/2009 | Endo | |
| 2009/0241031 A1 | 9/2009 | Gamaley | |
| 2009/0289813 A1 | 11/2009 | Kwiecinski | |
| 2009/0309970 A1 | 12/2009 | Ishii | |
| 2009/0313095 A1 | 12/2009 | Hurpin | |
| 2010/0025942 A1 | 2/2010 | Mangaroo | |
| 2010/0061564 A1 * | 3/2010 | Clemow | G10K 11/178 381/71.6 |
| 2010/0114471 A1 | 5/2010 | Sugiyama | |
| 2010/0114488 A1 | 5/2010 | Khamharn | |
| 2010/0136944 A1 | 6/2010 | Taylor | |
| 2010/0152972 A1 | 6/2010 | Attard | |
| 2010/0156672 A1 | 6/2010 | Yoo | |

(56) References Cited

U.S. PATENT DOCUMENTS

| | | |
|---|---|---|
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1* | 8/2014 | Matters ............... B62D 15/027 701/2 |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker et al. |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1* | 5/2016 | Ohshima ............... G05D 1/0061 701/23 |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |

(56) References Cited

U.S. PATENT DOCUMENTS

| | | |
|---|---|---|
| 2017/0208438 A1 | 7/2017 | Dickow |
| 2017/0285634 A1* | 10/2017 | Chin .................. G05D 1/0022 |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1* | 1/2018 | McNew .................. B60Q 9/008 |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1* | 8/2018 | Nam .................. B62D 15/027 |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102012008858 A1 | 11/2012 |
| DE | 102009060169 A1 | 6/2013 |
| DE | 102011080148 A1 | 7/2013 |
| DE | 102012200725 A1 | 9/2013 |
| DE | 102010034129 B2 | 10/2013 |
| DE | 102011122421 A1 | 6/2014 |
| DE | 102012222972 A1 | 6/2014 |
| DE | 102013016342 A1 | 1/2015 |
| DE | 102014009077 A1 | 2/2015 |
| DE | 102012215218 A1 | 4/2015 |
| DE | 102012222972 A1 | 5/2015 |
| DE | 102013019904 A1 | 5/2015 |
| DE | 102014007915 A1 | 12/2015 |
| DE | 102014007915 A1 | 2/2016 |
| DE | 102014011802 A1 | 2/2016 |
| DE | 102014111570 A1 | 2/2016 |
| DE | 102014015655 A1 | 4/2016 |
| DE | 102014226458 A1 | 6/2016 |
| DE | 102015209976 A1 | 12/2016 |
| DE | 102014015655 A1 | 5/2017 |
| DE | 102016011916 A1 | 6/2017 |
| DE | 102016125282 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| EP | 2135788 B1 | 6/2017 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 2004142543 A | 5/2004 |
| JP | 2004287884 A | 10/2004 |
| JP | 2005193742 A | 7/2005 |
| JP | 2004142543 A | 4/2009 |
| JP | 2016119032 A | 4/2009 |
| JP | 2004287884 A | 7/2014 |
| JP | 2014134082 A1 | 7/2014 |
| JP | 2016119032 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20100006714 A | 1/2010 |
| KR | 20160051993 A | 1/2010 |
| KR | 20130106005 A | 9/2013 |
| KR | 20160039460 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2015/068032 A1 | 8/2016 |
| WO | WO 2015/193058 A1 | 9/2016 |
| WO | WO 2017/062448 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/097942 A1 | 7/2017 |
| WO | WO 2017/118510 A1 | 7/2017 |

OTHER PUBLICATIONS

Al-Sherbaz, Ali et al., Hybridisation of GNSS with other wireless/sensors technologies on board smartphones to offer seamless outdoors-indoors positioning for LBS applications, Apr. 2016, 3 pages.

Jingbin Liu, IParking: An Intelligent Indoor Location-Based Smartphone Parking Service, Oct. 31, 2012, 15 pages.

Land Rover develops a smartphone remote control for its SUVs, James Vincent, Jun. 18, 2015.

(56) References Cited

OTHER PUBLICATIONS

Alberto Broggi and Elena Cardarelli, Vehicle Detection for Autonomous Parking Using a Soft-Cascade ADA Boost Classifier, Jun. 8, 2014.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 pages).
Land Rover, Land Rover Remote Control Via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 pages).
Search Report dated May 21, 2018 for Great Britain Patent Application No. GB 1800277.4 (5 pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.

* cited by examiner

AUDIO ALERTS FOR REMOTE PARK-ASSIST TETHERING

TECHNICAL FIELD

The present disclosure generally relates to remote park-assist and, more specifically, to audio alerts for remote park-assist tethering.

BACKGROUND

Vehicles oftentimes include functions in which at least some motive functions of a vehicle are autonomously controlled by the vehicle. For example, some vehicles include cruise control in which the vehicle controls acceleration and/or deceleration of the vehicle so that a speed of the vehicle is maintained. Some vehicles include adaptive cruise control in which the vehicle controls acceleration and/or deceleration of the vehicle so that a speed of the vehicle is maintained while also maintaining a predetermined following distance from other vehicles ahead. Further, some vehicles include park-assist features in which the vehicle autonomously controls motive functions of the vehicle to park the vehicle into a parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for audio alerts for remote park-assist tethering. An example disclosed vehicle includes an exterior surface, a speaker, a communication node for wireless communication with a mobile device, an autonomy unit for remote parking, and a controller. The controller is to receive, via the communication node, an instruction from the mobile device to perform the remote parking and emit an alert, via the speaker, responsive to determining the mobile device is beyond a threshold range from the exterior surface while sending the instruction.

An example disclosed method includes receiving, via a communication node of a vehicle, an instruction from a mobile device to perform remote parking of the vehicle. The example disclosed method also includes determining, via a processor, whether mobile device is beyond a threshold range from an exterior surface of the vehicle and emitting an alert, via a speaker of the vehicle, responsive to determining the mobile device is beyond the threshold range while sending the instruction.

An example disclosed system includes a mobile device to send an instruction to perform remote parking. The example disclosed system also includes a vehicle that includes an exterior surface, a speaker, a communication node, an autonomy unit for performing the remote parking, and a controller. The controller is to receive the instruction via the communication node and emit an alert, via the speaker, responsive to determining the mobile device is beyond a threshold range from the exterior surface while sending the instruction.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
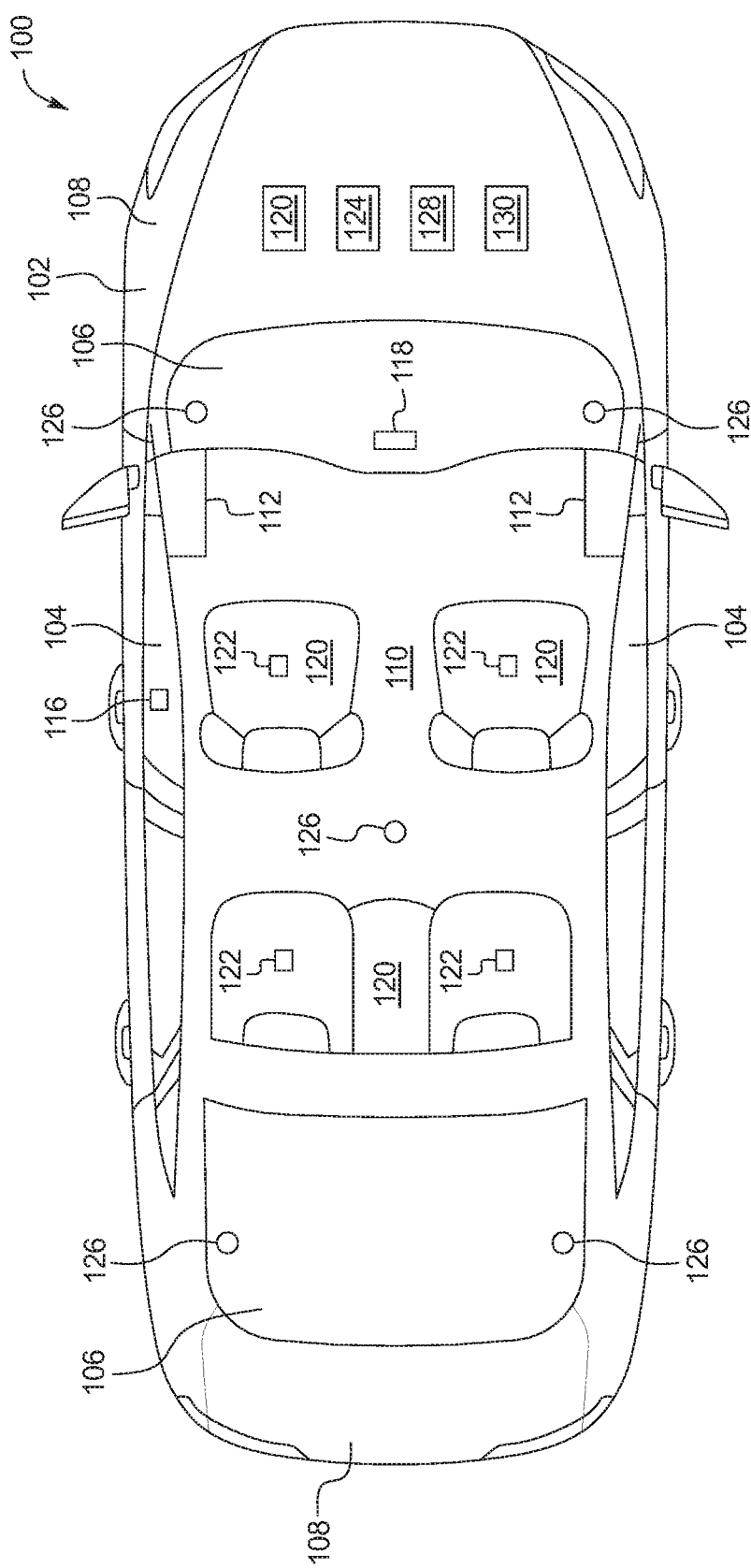
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles oftentimes include functions in which at least some motive functions of a vehicle are autonomously controlled by the vehicle. Some vehicles include cruise control in which the vehicle controls acceleration and/or deceleration of the vehicle so that a speed of the vehicle is maintained. Some vehicles include adaptive cruise control in which the vehicle controls acceleration and/or deceleration of the vehicle so that a speed of the vehicle is maintained while also maintaining a predetermined following distance from other vehicles ahead.

Further, some vehicles include park-assist features in which the vehicle autonomously controls motive functions of the vehicle to park the vehicle into a parking spot. In some such instances, a vehicle includes a remote park-assist feature in which the vehicle autonomously parks itself after a driver and/or other operator of the vehicle has already exited the vehicle. For instance, the driver may position the vehicle near a parking spot, exit the vehicle, and remotely instruct the vehicle (e.g., via a button on a key fob or mobile device) to autonomously park in the parking spot. Recently, some governmental regulations require that a user be within a predetermined distance of the vehicle while remotely instructing the vehicle to perform remote parking. In such instances, the vehicle is to be unable to move autonomously while the user is greater than the predetermined distance from the vehicle.

Example methods and apparatus disclosed herein emit audio alarm(s) to a user of a mobile device that is instructing a vehicle to perform remote parking upon determining that the mobile device is approaching a tethering range of the vehicle beyond which the remote parking is disabled. The audio alarms enable the user to receive warnings about the tethering range of the vehicle while continuing to carefully watch the vehicle and its surroundings as the vehicle performs remote parking. Further, the vehicle emits the audio alerts to indicate to the user that the alarm heard by the user relates to functionality of the vehicle (and not of the mobile device).

As used herein, "remote parking" and "remote park-assist" refer to a vehicle controlling motive functions of the vehicle without direct steering or velocity input from a driver to autonomously park the vehicle into a parking spot while the driver is located outside of the vehicle. For example, a remote park assist-system of an autonomy unit controls the motive functions of the vehicle upon initiation from a driver to remotely park the vehicle into a parking spot.

As used herein, to "tether" refers to enabling a mobile device to cause a vehicle to perform remote parking. For example, a vehicle is configured to perform remote parking upon receiving instruction(s) to do so from a mobile device when the mobile device is tethered to the vehicle and is configured to not perform remote parking when the mobile device is untethered from the vehicle. As used herein, a "tethered" device refers to a device (e.g., a mobile device, a key fob) that is enabled to send instructions to a vehicle to perform remote parking. For example, a mobile device is tethered to a vehicle responsive to the mobile device being wirelessly communicatively coupled to the vehicle and located within a predetermined tethering range (e.g., 6 meters) of the vehicle. In such examples, a mobile device that sends instructions to a vehicle to perform remote parking is untethered from the vehicle if the mobile device is beyond the tethering range of the vehicle.

Examples disclosed herein include a remote park-assist (also referred to as RePA) system of a vehicle that provides audio feedback to instruct a user of a mobile device instructing the vehicle to perform remote parking to stay within a predetermined tethering range of the vehicle during the remote parking. In some examples, the RePA system adjusts a sound of the audio feedback to indicate a change in a distance between the mobile device and the vehicle. For example, a speaker of the vehicle (e.g., a cabin speaker, a horn, a horn-chirp speaker, a door-chirp speaker, an audio actuator coupled to a vehicle window) and/or a speaker of the mobile device provides the audio feedback to the user. In some examples, the RePA system does not utilize cabin speakers or audio actuators coupled to vehicle windows to emit the audio feedback in response to determining that an occupant is located within a cabin of the vehicle. In some examples, the RePA system adjusts the sound emitted by vehicle speakers to account for a Doppler effect. Further, in some examples, a microphone of the mobile device and/or the vehicle is utilized to collect feedback to enable the audio signals emitted by the vehicle and the mobile device to be synced together.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes an exterior surface 102. As illustrated in FIG. 1, the exterior surface 102 includes one or more doors 104, one or more windows 106, and one or more panels 108. For example, the windows 106 of the vehicle 100 include a front windshield, a rear windshield, and side windows of the doors 104. In some examples, one or more of the windows 106 (e.g., the front windshield) is formed of laminated or safety glass and/or one or more of the windows 106 (e.g., the rear windshield, the side windows) are formed of non-laminated, tempered glass. In the illustrated example, the panels 108 include a front panel (also referred to as a hood), a rear panel (also referred to as a tailgate panel and/or a trunk panel), and door panels of the doors 104. The panels 108 are formed of, for example, steel, aluminum, other metallic material, plastic, carbon fiber, fiberglass, other composite material, and/or any combination thereof. Further, in the illustrated example, each of the doors 104 the (e.g., a driver door, a front passenger door, a rear passenger door) include one of the windows 106 (e.g., a side window) and one of the panels 108 (e.g., a door panel).

The vehicle 100 also includes a cabin 110 (also referred to as a vehicle cabin). As illustrated in FIG. 1, the cabin 110 is defined, at least in part, by one or more of the doors 104 and/or one or more of the windows 106. Cabin speakers 112 are located within the cabin 110 of the vehicle 100. For example, the cabin speakers 112 emit audio signals including information, such as instructions, warnings, and entertainment, to occupant(s) (e.g., an operator, a passenger) located within the cabin 110 of the vehicle 100.

As illustrated in FIG. 1, the vehicle 100 also includes a horn 114. For example, the horn 114 emits a loud audio signal. For example, an operator (e.g., a driver) of the vehicle 100 activates the horn 114 (e.g., by pressing a button located within a driving wheel of the vehicle 100) to alert pedestrians, vehicle operators, and/or other people of a presence of the vehicle 100 and/or of a nearby hazard.

The vehicle 100 of the illustrated example also includes a door-chirp speaker 116 that emits a chirp when an engine of the vehicle 100 is off and the doors 104 become locked. That is, the door-chirp speaker 116 emits an alert to inform a user of the vehicle 100 (e.g., a user 206 of FIG. 2) that the doors 104 have transitioned to a locked state. For example, the door-chirp speaker 116 is located within one or more of the doors 104 and emits an audio signal that is softer and/or quieter than that of the horn 114. In, the illustrated example, one of the doors 104 includes the door-chirp speaker 116. In other examples, the vehicle 100 a plurality of the doors 104 includes a door-chirp speaker 116. For example, the vehicle 100 may include a door-chirp speaker 116 on a driver side of the vehicle 100 and another door-chirp speaker 116 on a passenger side of the vehicle 100.

Further, the vehicle 100 of the illustrated example includes an audio actuator 118. (also referred to as a vibration speaker audio actuator) that is coupled to a portion of the exterior surface 102 of the vehicle 100. For example, the audio actuator 118 (e.g., a SoundBug device) is rigidly mounted to one the doors 104, one of the windows 106, one of the panels 108, etc. The audio actuator 118 is configured to emit sound by vibrating the portion of the exterior surface 102 to which the audio actuator 118 is coupled. For example, the audio actuator 118 includes an arm that actuates upon receiving an electrical signal. The arm contacts or causes another actuator component to contact an adjacent portion of the exterior surface 102 to vibrate. That is, the audio actuator 118 functions as a tuning fork by actuating an adjacent portion of the exterior surface 102 to cause that portion of the exterior surface 102 to form an acoustic baffle of a speaker. In other words, the exterior surface 102 of the vehicle 100 and the audio actuator 118 form a speaker. Further, in the illustrated example, the vehicle 100 includes an audio actuator 118. In other examples, the vehicle 100 includes a plurality of audio actuators 118. For example, one of the audio actuators 118 is located on each side of the vehicle 100 to enable the audio actuators 118 to emit audio signals in each direction from the vehicle 100.

As illustrated in FIG. 1, one or more seats 120 are located within cabin 110 for occupant(s) of the vehicle 100. For example, the seats 120 include a driver seat (also referred to as an operator seat), a front passenger seat, and rear passenger seats. In the illustrated example, at least some of the seats 120 of the vehicle 100 include occupancy sensors 122 to detect whether an occupant is present within the cabin 110 at the corresponding one of the seats 120. For example, one or more of the occupancy sensors 122 detect whether an occupant is located at the driver seat of the seats 120, one or more of the occupancy sensors 122 detect whether an occupant is located at the front passenger seat of the seats 120, and one or more of the occupancy sensors 122 detect whether occupant(s) are located at one or more of the rear passenger seats of the seats 120.

In the illustrated example, the vehicle 100 also includes a global positioning system (GPS) receiver 124. For example, the GPS receiver 124 receives a signal from a global positioning system to determine a location of the vehicle 100.

Figure 2:
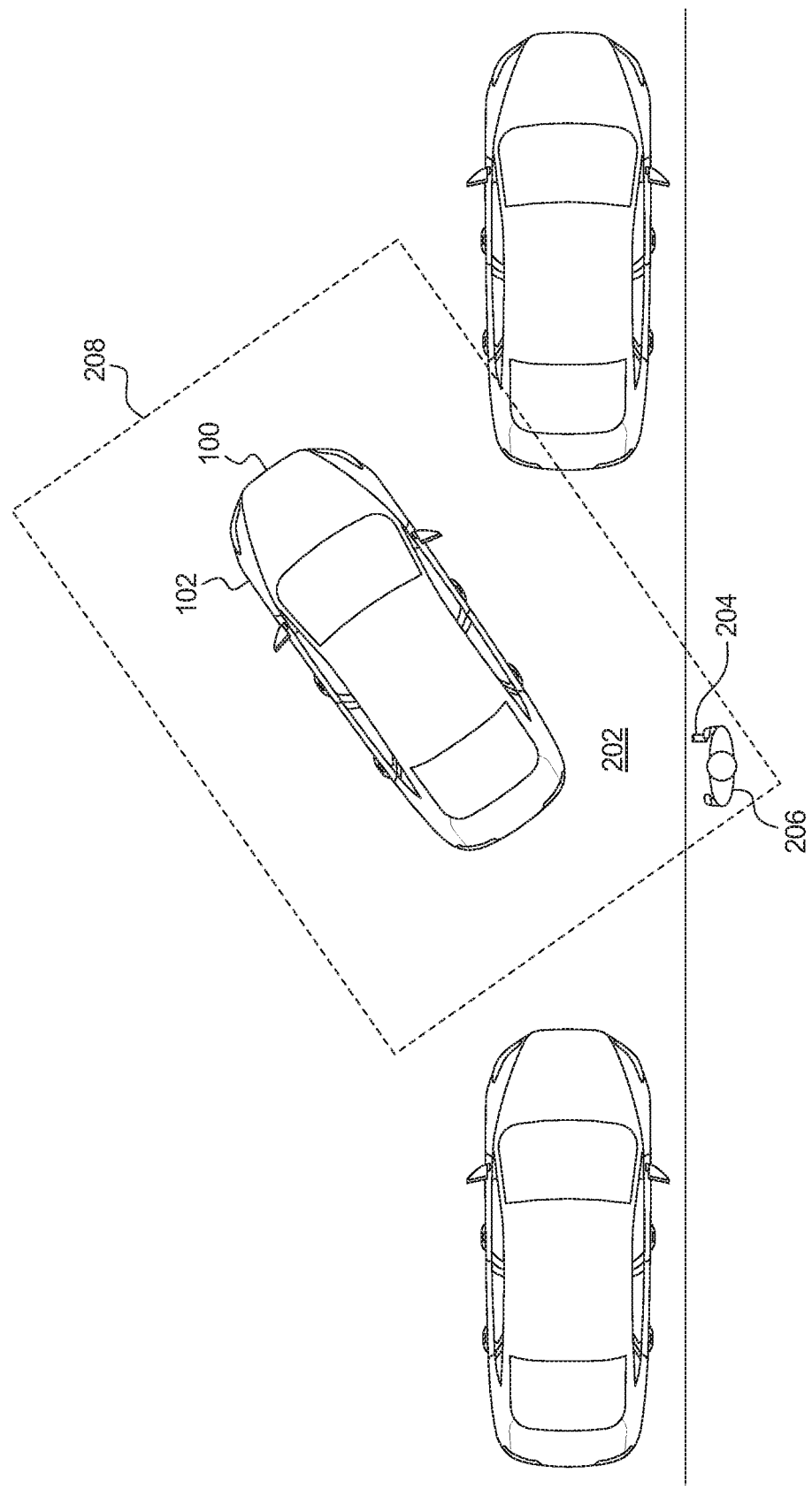
FIG. 2 illustrates an example mobile device tethered to the vehicle of FIG. 1 for remote parking of the vehicle.

Further, the vehicle 100 includes communication nodes 126 that are configured to communicatively connect to a key fob and/or a mobile device of a user 134 of the vehicle 100 (e.g., a mobile device 204 of a user 206 of FIG. 2). As used herein, a "key fob" refers to an electronic device that wirelessly communicates with the vehicle 100 (e.g., via one or more of the communication nodes 126) to unlock and/or lock one or more of the doors 104, open and/or close one or more of the doors 104, activate an engine of the vehicle 100, and/or initiate other function(s) of the vehicle 100. In some examples, a user of the vehicle 100 utilizes a mobile device that functions as a phone-as-a-key for wireless communication with the communication nodes 126. As used herein, a "phone-as-a-key" refers to a mobile device (e.g., a smart phone, a wearable, a smart watch, a tablet, etc.) that includes hardware and/or software to function as a key fob.

The communication nodes 126 include hardware and firmware to establish a wireless connection with a key fob and/or a mobile device. For example, the communication nodes 126 are short-range wireless modules that wirelessly communicate with key fob(s) and/or phone-as-the-key(s) of user(s) (e.g., the mobile device 204 of the user 206) of the vehicle 100 via short-range wireless communication protocols. In some examples, the communication nodes 126 implement the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other examples, the communication nodes 126 may use WiFi, WiMax, NFC, UWB (Ultra-Wide Band), and/or any other communication protocol that enables the communication nodes 126 to communicatively couple to a key fob and/or a mobile device.

Prior to communicating with a key fob and/or a mobile device, one or more of the communication nodes 126 may be utilized to authenticate the key fob and/or mobile device for communication with the communication nodes 126. Upon being authenticated, the key fob and/or mobile device is paired with the vehicle 100. For example, to authenticate a key fob and/or mobile device, one or more of the communication nodes 126 intermittently broadcast a beacon (e.g., a low-energy beacon such as Bluetooth® low-energy (BLE) beacon). When the key fob and/or mobile device is within a broadcast range of the one or more of the communication nodes 126, the key fob and/or mobile device receives the beacon and subsequently sends a key. One or more of the communication nodes 126 authenticate the key fob and/or mobile device for communication with the communication nodes 126 upon receiving the key from the key fob and/or mobile device. In other examples, the key fob and/or mobile device 132 broadcasts a beacon and one or more of the communication nodes 126 subsequently receive the beacon to authenticate communication between the key fob and/or mobile device and the communication nodes 126.

The vehicle 100 of the illustrated example also includes an autonomy unit 128. The autonomy unit 128 is an electronic control unit (ECU) of the vehicle 100 that performs autonomous and/or semi-autonomous functions of the vehicle 100. For example, the autonomy unit 128 autonomously controls motive functions of the vehicle 100 to perform remote parking of the vehicle 100 into an available parking spot (e.g., a parking spot 202 of the FIG. 2) and/or to otherwise autonomously and/or semi-autonomously drive the vehicle 100. For example, the autonomy unit 128 controls motive functions of the vehicle 100 based on data collected from sensor(s) (e.g., radar sensor(s), lidar sensor(s), ultrasonic sensor(s), etc.) of the vehicle 100 and/or camera(s) of the vehicle 100.

In the illustrated example, the autonomy unit 128 performs remote parking of the vehicle 100 upon a user (e.g., the user 206) initiating remote parking via a mobile device (e.g., the mobile device 204) that is tethered to the vehicle 100. For example, the autonomy unit 128 is configured to perform remote parking only when the mobile device initiating remote parking of the vehicle 100 is within a predetermined tethering range (e.g., a tethering range 208 of FIG. 2).

As illustrated in FIG. 1, the vehicle 100 includes a tethering controller 130 that monitors a tethering of a mobile device (e.g., the mobile device 204) to the vehicle 100. For example, the tethering controller 130 is configured to determine a location of a mobile device that is communicatively coupled to one or more of the communication nodes 126 relative to the exterior surface 102 of the vehicle 100. Further, the tethering controller 130 is configured to determine whether the mobile device in communication with one or more of the communication nodes 126 is within a tethering range (e.g., the tethering range 208) of the vehicle 100 and emits alert(s) based upon a position of the mobile device within the tethering range.

FIG. 2 illustrates the vehicle 100 being remotely parked into a parking spot 202 via a mobile device 204 of a user 206 (e.g., an operator of the vehicle 100). In the illustrated example, the parking spot 202 is a parallel parking spot. In other examples, the parking spot 202 for which the user 206 utilizes remote park-assist is a perpendicular parking spot or a diagonal parking spot.

As illustrated in FIG. 2, the autonomy unit 128 of the vehicle 100 performs remote parking when the user 206 is located outside of the cabin 110 of the vehicle 100. The user 206 utilizes the mobile device 204 to send an instruction (also referred to as a RePA instruction) to the vehicle 100 to perform remote parking. For example, the user 206 provides an input to cause a communication module of the mobile device 204 (e.g., a communication module 406 of FIG. 4) to wirelessly send an instruction to the communication nodes 126 of the vehicle 100. The tethering controller 130 receives the instruction to perform remote parking from the mobile device 204 via one or more of the communication nodes 126.

Further, the tethering controller 130 determines whether the autonomy unit 128 is to perform remote parking upon receiving the instruction to do so based upon, at least in part, whether the mobile device 204 is tethered to the vehicle 100. For example, the mobile device 204 is tethered to the vehicle 100 responsive to the mobile device 204 being (i) wirelessly communicatively coupled to one or more of the communication nodes 126 of the vehicle 100 and (ii) located within the tethering range 208 of the vehicle 100. That is, the autonomy unit 128 is configured to perform remote parking of the vehicle 100 responsive to the tethering controller 130 determining that the mobile device 204 is within the tethering range 208 while sending the remote parking instruction to the vehicle 100. Further, the autonomy unit 128 is configured to not perform remote parking of the vehicle 100 responsive to the tethering controller 130 determining that the mobile device 204 is beyond the tethering range 208 while sending the remote parking instruction to the vehicle 100. That is, if the mobile device 204 moves from within to beyond the tethering range 208, the autonomy unit 128 (temporarily) disables performance of remote parking. To reactivate remote parking, the user 206 is to move mobile device 204 back into the tethering range and resend a remote parking instruction to the vehicle 100 while within the tethering range 208.

In the illustrated example, the tethering range 208 is defined based upon a predetermined distance (e.g., 6 meters) from the exterior surface 102 of the vehicle 100. That is, the mobile device 204 is within the tethering range 208 of the vehicle 100 if a distance between the mobile device 204 and the exterior surface 102 of the vehicle 100 is less than or equal to the predetermined distance. In some examples, the tethering controller 130 determines the distance between the mobile device 204 and the exterior surface 102 of the vehicle 100 based upon received signal strength indicator(s) (RSSI) of signal(s) that are communicated between the mobile device 204 and one or more of the communication nodes 126. For example, the tethering controller 130 determines the distance between the mobile device 204 and the exterior surface 102 based upon the RSSI(s) of the instruction(s) sent to the vehicle 100 by the mobile device 204 to perform remote parking. In some examples, the tethering controller 130 determines the distance between the mobile device 204 and the vehicle 100 via GPS locations of the mobile device 204 and the vehicle 100. For example, the tethering controller 130 determines the location of the vehicle 100 via the GPS receiver 124 and the location of the mobile device 204 via a GPS receiver of the mobile device 204. Additionally or alternatively, the tethering controller 130 may utilize any other manner (e.g., time-of-flight, angle-of-arrival, dead reckoning, etc.) for determining the distance between the mobile device 204 and the exterior surface 102 of the vehicle 100.

Figure 3:
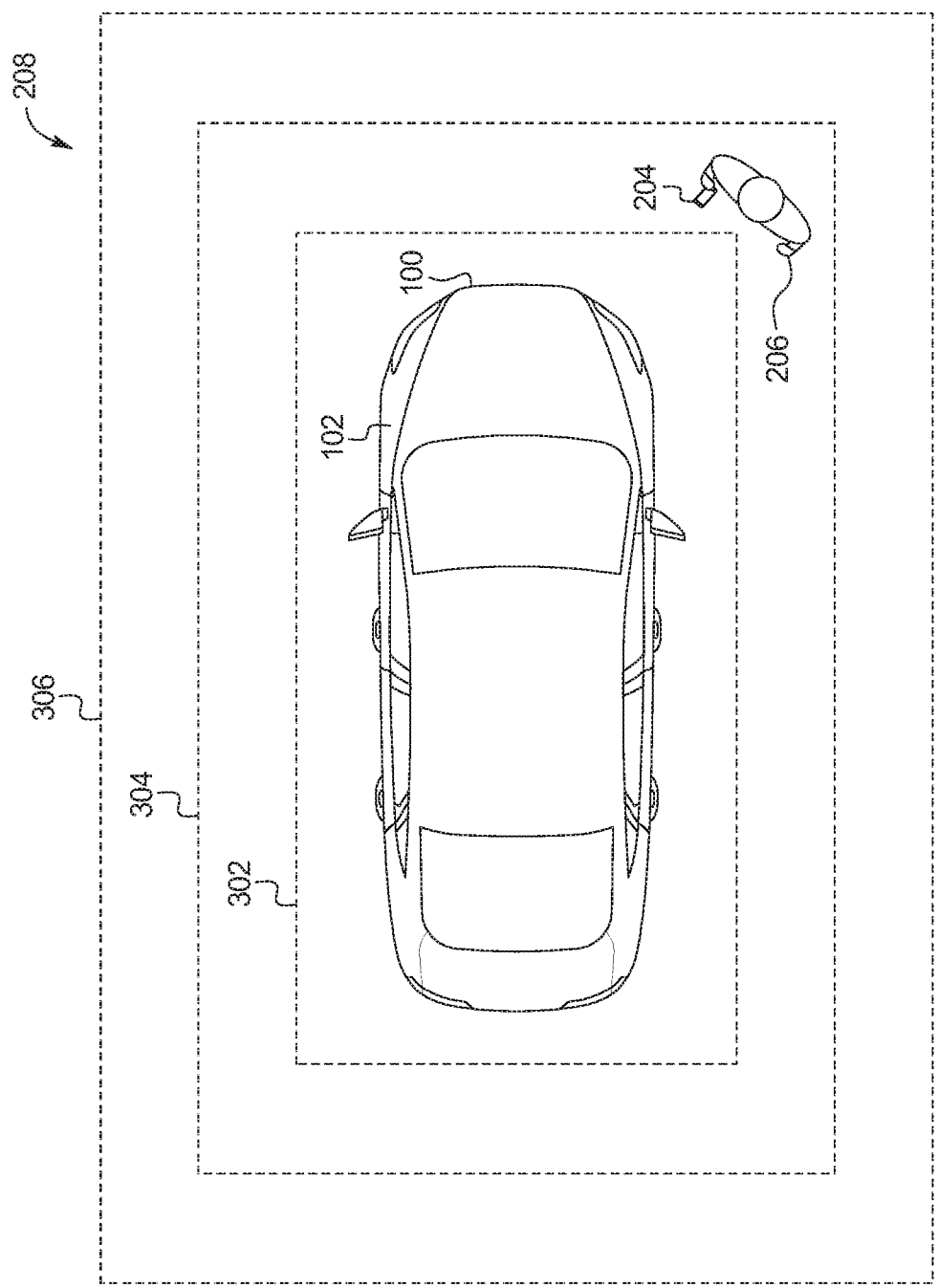
FIG. 3 illustrates an example tethering range of the vehicle of FIGS. 1-2.

FIG. 3 further depicts the tethering range 208 of the vehicle 100. Additionally, FIG. 3 illustrates a threshold range 302 (e.g., a first threshold range), a threshold range 304 (e.g., a second threshold range), and an outer boundary 306 of the tethering range 208 of the vehicle 100. As illustrated in FIG. 3, the threshold range 302 and the threshold range 304 are within the tethering range 208 of the vehicle 100. Further, the threshold range 304 is less than the tethering range 208, and the threshold range 302 is less than the threshold range 304. In other words, the threshold range 304 is greater than the threshold range 302, and the tethering range 208 is greater than the threshold range 304.

In the illustrated example, the threshold range 302 is defined based upon a predetermined distance (e.g., 3 meters) from the exterior surface 102 of the vehicle 100. That is, the mobile device 204 is within the threshold range 302 of the vehicle 100 if a distance between the mobile device 204 and the exterior surface 102 of the vehicle 100 is less than or equal to that predetermined distance. Further, the threshold range 304 is defined based upon another predetermined distance (e.g., 5 meters) from the exterior surface 102 of the vehicle 100. That is, the mobile device 204 is within the threshold range 304 of the vehicle 100 if a distance between the mobile device 204 and the exterior surface 102 of the vehicle 100 is less than or equal to that predetermined distance.

The tethering controller 130 of the vehicle 100 is configured to emit alert(s) via speaker(s) based upon a location of the mobile device 204 of the user 206 relative to the threshold range 302, the threshold range 304, and/or the outer boundary 306 of the tethering range 208 of the vehicle 100. The tethering controller 130 emits the alert(s) while the mobile device 204 sends RePA instruction(s) to the vehicle 100 to warn the user 206 of a proximity to the outer boundary 306 of the tethering range 208. In turn, the alert(s) deter the user 206 from moving beyond the tethering range 208 and, thus, deter the user 206 from causing the autonomy unit 128 from disabling remote parking when the user 206 is beyond the tethering range 208. Further, the tethering controller 130 emit audio alert(s) to enable the user 206 to carefully monitor the vehicle 100 and its surroundings while the autonomy unit 128 performs remote parking of the vehicle 100.

In the illustrated example, an alert emitted by the tethering controller 130 via speaker(s) varies based upon based upon the location of the mobile device 204 within the tethering range 208 of the vehicle 100. For example, the tethering controller 130 does not emit an alert via speaker(s) in response to the mobile device 204 sending RePA instruction(s) while being located within the threshold range 302. The tethering controller 130 emits a first alert via speaker(s) in response to the mobile device 204 sending RePA instruction(s) while being located beyond the threshold range 302 and within the threshold range 304. The tethering controller 130 emits a second alert via speaker(s) in response to the mobile device 204 sending RePA instruction(s) while being located beyond the threshold range 304 and within the outer boundary 306 of the tethering range 208. Further, the tethering controller 130 emits a second alert via speaker(s) in response to the mobile device 204 sending RePA instruction(s) while being located along the outer boundary 306 of the tethering range 208. While the illustrated example includes two threshold ranges (i.e., the threshold range 302, the threshold range 304) within the tethering range 208 that correspond to different audio alerts, other examples may include more or less threshold ranges within the tethering range 208 that each correspond to different audio alerts.

In some examples, each of the audio alerts emitted by the tethering controller 130 via speaker(s) has different audio characteristics to enable the user 206 to distinguish between the first alert, the second alert, the third alert, etc. For example, the audio alerts have different sounds, tones, notes, intensities, sound pressure levels, frequencies, etc. to enable the user 206 to identify where he or she is located within the tethering range 208 based upon the emitted audio alert. In some examples, the third audio alert has a greater intensity, sound pressure level, and/or frequency relative to that of the second audio alert, which has a greater intensity, sound pressure level, and/or frequency relative to that of the first audio alert. In other words, the intensity, sound pressure level, and/or frequency of the audio alerts increases as the user 206 becomes closer to the outer boundary 306 of the tethering range 208 to warn the user 206 that he or she is approaching a point at which the autonomy unit 128 will disable the remote parking.

In some examples, the audio alert(s) emitted by the tethering controller 130 via speaker(s) varies as a distance between the mobile device 204 and the exterior surface 102 of the vehicle 100 varies. For example, the tethering controller 130 increases an intensity, a sound pressure level, a frequency, etc. of the audio alert responsive to detecting that the distance between the mobile device and the exterior surface 102 increases. Additionally or alternatively, the audio alert(s) emitted by the tethering controller 130 via speaker(s) varies as the distance between the mobile device and the exterior surface 102 increases to form an arpeggio that follows a musical scale, an octave sequence, a song, a melody, and/or any other musical sequence.

The tethering controller 130, for example, emits the audio alert(s) via one or more speakers of the vehicle 100. For example, one or more of the cabin speakers 112, the horn 114, a horn-chirp speaker, the door-chirp speaker 116, and/or the audio actuator 118 coupled to one of the windows 106 of the vehicle 100 emit the audio alert(s) for the user 206. In some examples, speaker(s) of the vehicle 100 emit the audio alert(s) to draw attention to the vehicle 100 and/or away from the mobile device 204 while the autonomy unit 128 is performing remote parking. Further, in some examples, the tethering controller 130 prevent the cabin speakers 112 and the audio actuator 118 coupled to one of the windows 106 from emitting the audio alert(s) while an occupant is located within the cabin 110 of the vehicle 100. For example, the tethering controller 130 prevent the cabin speakers 112 and the audio actuator 118 from emitting the audio alert(s) responsive to one or more of the occupancy sensors 122 detecting that an occupant is within the cabin 110 to prevent loud audio signals from being emitted within the cabin 110 while the occupant is within the cabin 110.

Further, in some examples, the tethering controller 130 sends an alert signal to the mobile device 204 via one or more of the communication nodes 126 to instruct the mobile device 204 to emit an audio alert to the user 206 via a speaker (e.g., a speaker 408 of FIG. 4) of the mobile device 204. The mobile device 204 includes a communication module (e.g., a communication module 406 of FIG. 4) that receives the alert signal from one or more of the communication nodes 126 of the vehicle 100 and emits an alert via the speaker of the mobile device 204 (also referred to as a mobile device speaker) responsive to the communication module of the mobile device 204 receiving the audio alert.

In some examples, the audio alert(s) are emitted by both speaker(s) of the vehicle 100 and the speaker of the mobile device 204 in a synchronized manner. That is, the speaker(s) of the vehicle 100 and the speaker of the mobile device 204 are synchronized to emit the audio alert(s) to the user 206. In some examples, the speaker(s) of the vehicle 100 and the speaker of the mobile device 204 are synchronized to emit the audio alert(s) simultaneously. The audio signal emitted by the speaker(s) of the vehicle 100 may match and/or harmonize with the audio signal emitted by the speaker of the mobile device 204. Further, the audio signal emitted by the speaker(s) of the vehicle 100 and the audio signal emitted by the speaker of the mobile device 204 may result in a dissonant sound and/or off-scale note when the mobile device 204 is along the outer boundary 306 of the tethering range 208 to provide a warning that the user 206 is about to move beyond the tethering range 208. In other examples, the speaker(s) of the vehicle 100 and the speaker of the mobile device 204 are synchronized to emit the audio alert(s) in an alternating and/or modulating pattern.

Further, in some examples, the vehicle 100 and/or the mobile device 204 includes a microphone to facilitate synchronization of the audio alert(s) emitted by the speaker(s) of the vehicle 100 and the speaker of the mobile device 204. That is, the tethering controller 130 of the vehicle 100 and/or a processor (e.g., a processor 402 of FIG. 4) of the mobile device 204 process audio signal(s) collected by the microphone to enable the tethering controller 130 and/or the processor of the mobile device 204 to synchronize the audio alert(s) emitted by the vehicle 100 and the mobile device 204. For example, to account for a delay in one of the emitted audio signals that cause the audio signals emitted by the vehicle 100 and the mobile device 204 to be out-of-synch, the tethering controller 130 and/or the processor of the mobile device 204 delays emitting one of the audio signals to facilitate synchronization of the audio signals. Further, the tethering controller 130 of the vehicle 100 and/or the processor of the mobile device 204 process the audio signal(s) collected by the microphone to reduce an effect of ambient noise on the synchronization of the audio alert(s) emitted by the vehicle 100 and the mobile device 204. In some examples, one of the speakers of the vehicle 100 and/or the mobile device 204 is utilized to function as a microphone. Additionally or alternatively, the tethering controller 130 adjusts the audio alert emitted via the speaker(s) of the vehicle 100 to prevent a Doppler affect from effecting a sound of the audio alert that is heard by the user 206. For example, the tethering controller 130 adjusts the audio alert to account for the Doppler affect based upon audio signal(s) collected by the microphone of the mobile device 204.

Figure 4:
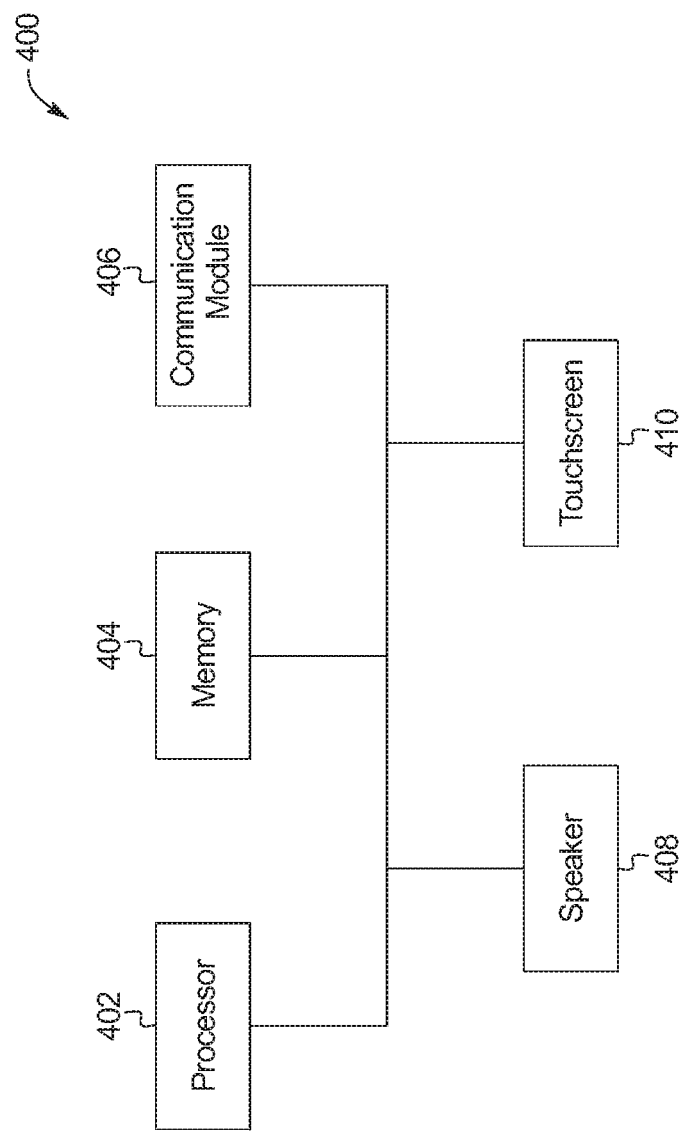
FIG. 4 is a block diagram of electronic components of the mobile device of FIG. 2.

FIG. 4 is a block diagram of electronic components 400 of the mobile device 204. As illustrated in FIG. 4, the electronic components 400 of the mobile device 204 include a processor 402, memory 404, a communication module 406, a speaker 408 (also referred to as a mobile device speaker), and a touchscreen 410.

The processor 402 of the electronic components 400 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). In some examples, the processor 402 is structured to include the tethering controller 130. Further, the memory 404 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 404 includes multiple kinds of memory, particularly volatile memory and non-volatile memory.

The memory 404 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 404, the computer readable medium, and/or within the processor 402 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The communication module 406 of the electronic components 400 is configured to communicatively connect to the communication nodes 126 of the vehicle 100. The communication module 406 includes hardware and firmware to establish a wireless connection with the communication nodes 126 of the vehicle 100. For example, the communication module 406 is a short-range wireless module that wirelessly communicates with other communication module(s) and/or node(s) (e.g., the communication nodes 126 of the vehicle 100) via short-range wireless communication protocols. In some examples, the communication module 406 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other examples, the communication module 406 may use WiFi, WiMax, NFC, UWB (Ultra-Wide Band), and/or any other communication protocol that enables the communication module 406 to communicatively couple to the communication nodes 126 of the vehicle 100.

The speaker 408 and the touchscreen 410 of the electronic components 400 provides an interface between the mobile device 204 and the user 206. For example, the mobile device 204 includes input devices and output devices, such as the speaker 408 and the touchscreen 410, to receive input from and present information to the user 206. The input devices include, for example, the touchscreen 410, a digital camera for image capture and/or visual command recognition, an audio input device (e.g., cabin microphone), buttons, etc. The output devices include, for example, the touchscreen 410, other display(s) (e.g., a liquid crystal display (LCD), an organic light emitting diode (OLED) display, a flat panel display, a solid state display, etc.), linear resonant actuator(s), and/or the speaker 408. For example, the user 206 provides an input via the touchscreen 410 that is communicated to the vehicle 100 via the communication module 406 to initiate remote parking of the vehicle 100. Further, the speaker 408 and/or the touchscreen 410 may provide alert(s) to the user 206 with respect to the tethering range 208, the threshold range 302, the threshold range 304, and/or the outer boundary 306 of the tethering range 208 while the remote parking is being performed.

Figure 5:
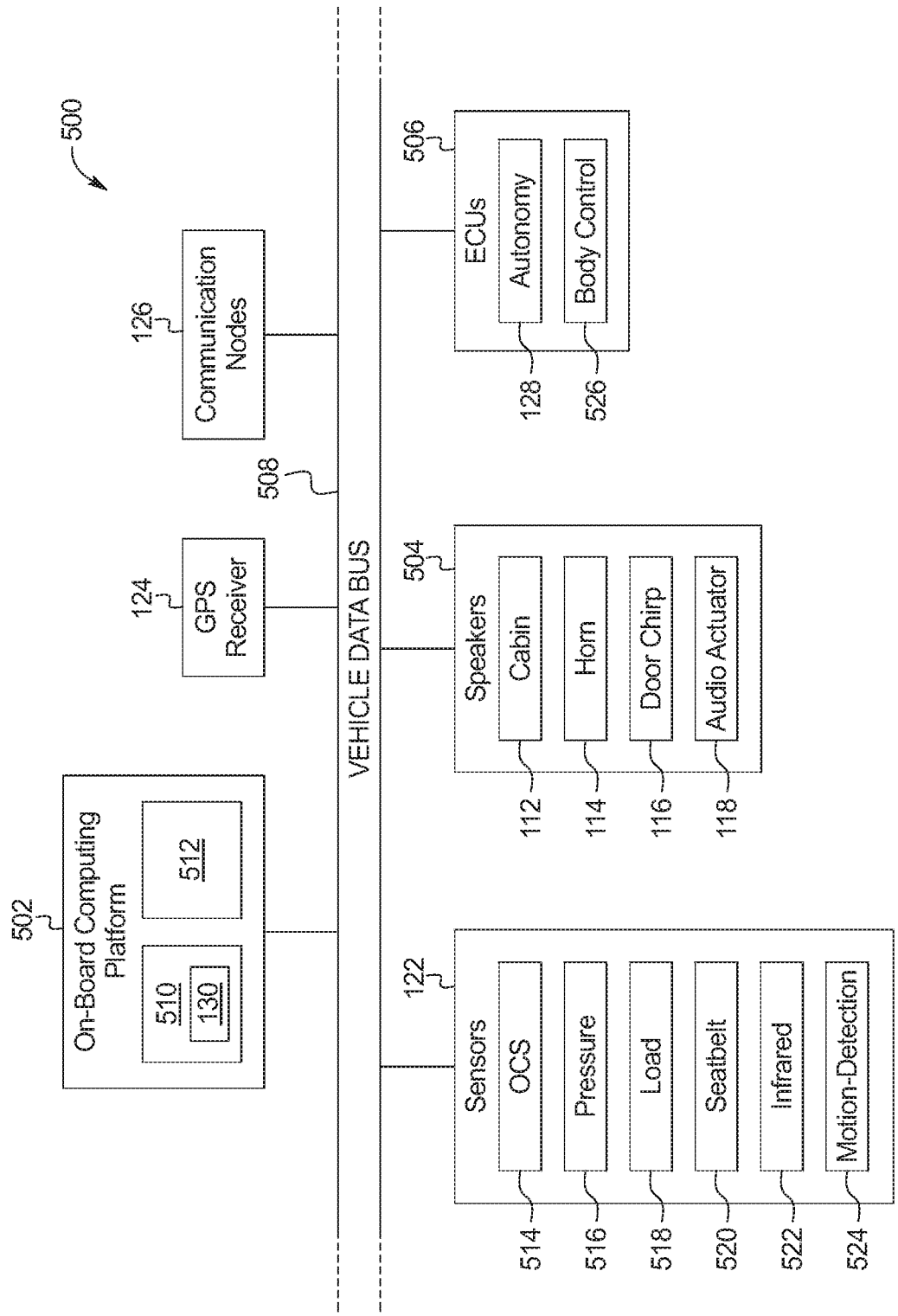
FIG. 5 is a block diagram of electronic components of the vehicle of FIGS. 1-2.

FIG. 5 is a block diagram of electronic components 500 of the vehicle 100. As illustrated in FIG. 5, the electronic components 500 of the vehicle 100 include the on-board computing platform 502, the GPS receiver 124, the communication nodes 126, the occupancy sensors 122, speakers 504, electronic control units (ECUs) 506, and a vehicle data bus 508.

The on-board computing platform 502 includes a microcontroller unit, controller or processor 510 and memory 512. In some examples, the processor 510 of the on-board computing platform 502 is structured to include the tethering controller 130. Alternatively, in some examples, the tethering controller 130 incorporated into another electronic control unit (ECU) with its own processor 510 and memory 512. The processor 510 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 512 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 512 includes multiple kinds of memory, particularly volatile memory and non-volatile memory.

The memory 512 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 512, the computer readable medium, and/or within the processor 510 during execution of the instructions.

The occupancy sensors 122 of the electronic components 500 monitor the cabin 110 of the vehicle 100 to detect whether occupant(s) are present within the cabin 110. The occupancy sensors 122 and/or other sensors of the electronic components 500 of the vehicle 100 are arranged in and around the vehicle 100 to monitor properties of the vehicle 100 and/or an environment in which the vehicle 100 is located. One or more of the sensors may be mounted to measure properties around the exterior surface 102 of the vehicle 100. Additionally or alternatively, one or more of the sensors (e.g., the occupancy sensors 122) may be mounted inside the cabin 110 of the vehicle 100 or in a body of the vehicle 100 (e.g., an engine compartment, wheel wells, etc.) to measure properties within an interior of the vehicle 100. For example, the sensors of the vehicle 100 include accelerometers, odometers, tachometers, pitch and yaw sensors, wheel speed sensors, microphones, tire pressure sensors, biometric sensors and/or sensors of any other suitable type.

In the illustrated example, the occupancy sensors 122 that detect an occupant presence within the cabin 110 include occupant classification sensor(s) 514, pressure sensor(s) 516, load sensor(s) 518, seatbelt sensor(s) 520, infrared sensor(s) 522, and motion-detection sensor(s) 524. For example, the occupant classification sensor 514 monitors one or more of the seats 120 to detect whether an object is located at and/or to classify the object located at the corresponding one or more of the seats 120. The pressure sensor 516 measures a pressure applied at one or more of the seats 120 to identify whether occupant(s) are present within the cabin 110. The load sensor 518 measures a load on one or more of the seats 120 to identify whether occupant(s) are present within the cabin 110. The seatbelt sensor 520 (e.g., a Hall-effect sensor) detects whether a seatbelt at a corresponding one of the seats 120 is buckled or unbuckled. The infrared sensor 522 monitors infrared radiation at one or more of the seats 120 to identify whether occupant(s) are present within the cabin 110. The motion-detection sensor 524 (e.g., a microwave sensor, an ultrasonic sensor, etc.) detects whether there is movement at one or more of the seats 120 to identify whether occupant(s) are present within the cabin 110.

The speakers 504 of the illustrated example are configured to emit the alert(s) to the user 206 during remote parking of the vehicle 100. As illustrated in FIG. 5, the speakers 504 include the cabin speakers 112, the horn 114, the door-chirp speaker 116, and the audio actuator 118 coupled to one of the windows 106 and/or another portion of the exterior surface 102 of the vehicle 100.

The ECUs 506 monitor and control the subsystems of the vehicle 100. For example, the ECUs 506 are discrete sets of electronics that include their own circuit(s) (e.g., integrated circuits, microprocessors, memory, storage, etc.) and firmware, sensors, actuators, and/or mounting hardware. The ECUs 506 communicate and exchange information via a vehicle data bus (e.g., the vehicle data bus 508). Additionally, the ECUs 506 may communicate properties (e.g., status of the ECUs 506, sensor readings, control state, error and diagnostic codes, etc.) to and/or receive requests from each other. For example, the vehicle 100 may have seventy or more of the ECUs 506 that are positioned in various locations around the vehicle 100 and are communicatively coupled by the vehicle data bus 508.

In the illustrated example, the ECUs 506 include the autonomy unit 128 and a body control module 526. For example, the autonomy unit 128 controls performance of autonomous and/or semi-autonomous driving maneuvers of the vehicle 100 based upon, at least in part, image(s) and/or video captured by camera(s) of the vehicle 100 and/or information collected by sensor(s) (e.g., a radar sensor, a lidar sensor, an ultrasonic sensor, etc.) of the vehicle 100. The body control module 526 controls one or more subsystems throughout the vehicle 100, such as power windows, power locks, an immobilizer system, power mirrors, etc. For example, the body control module 526 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 508 communicatively couples the occupancy sensors 122, the GPS receiver 124, the communication nodes 126, the on-board computing platform 502, the speakers 504, and the ECUs 506. In some examples, the vehicle data bus 508 includes one or more data buses. The vehicle data bus 508 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
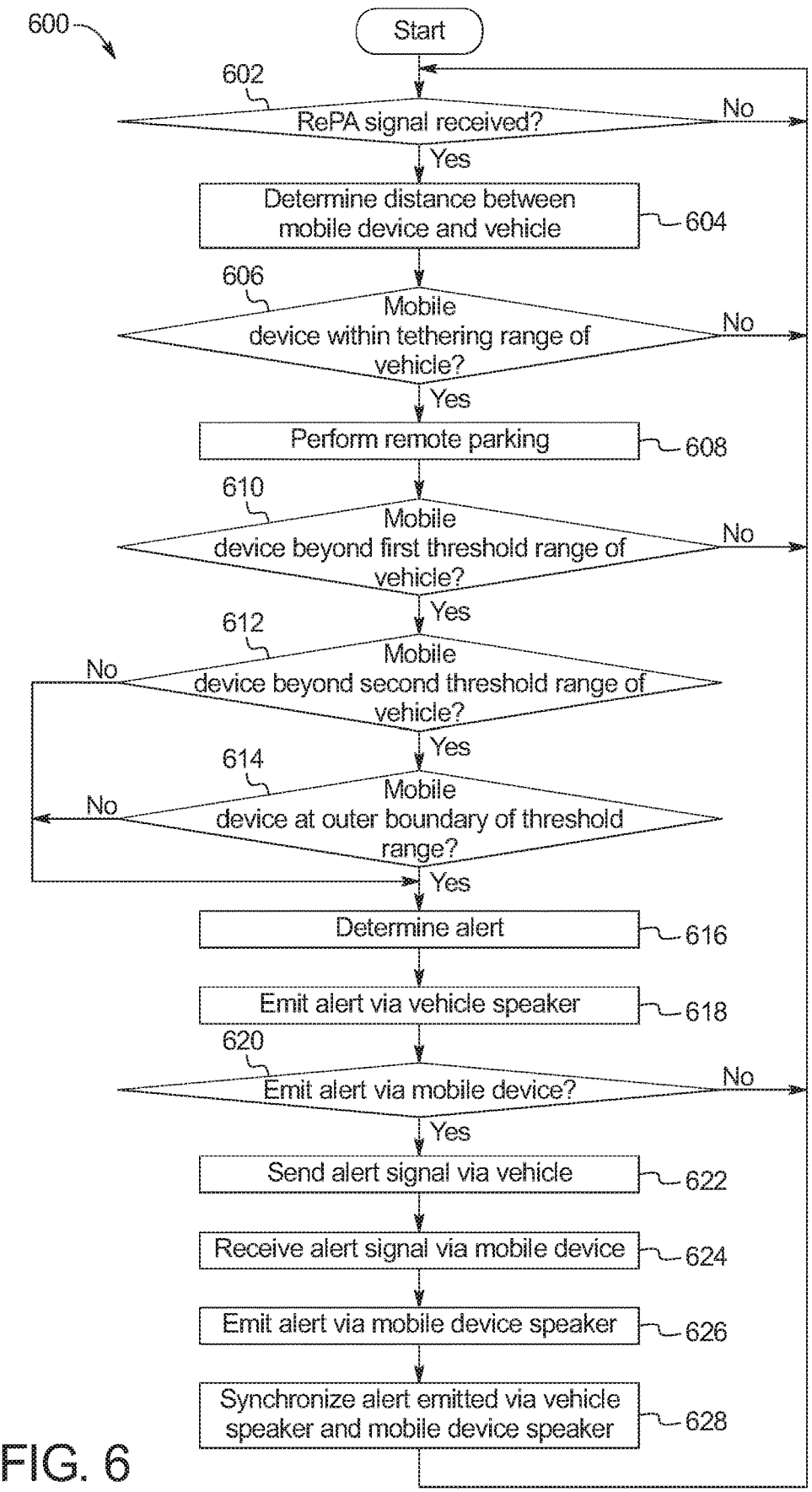
FIG. 6 is a flowchart for emitting audio alerts for tethering a mobile device to a vehicle for remote parking in accordance with the teachings herein.

FIG. 6 is a flowchart of an example method 600 to emit audio alerts for tethering a mobile device to a vehicle for remote parking. The flowchart of FIG. 6 is representative of machine readable instructions that are stored in memory (such as the memory 404 of FIG. 4 and/or the memory 512 of FIG. 5) and include one or more programs which, when executed by a processor (such as the processor 402 of FIG. 4 and/or the processor 510 of FIG. 5), cause the vehicle 100 and/or the mobile device 204 to implement the example tethering controller 130 of FIGS. 1 and 5. While the example program is described with reference to the flowchart illustrated in FIG. 6, many other methods of implementing the example tethering controller 130 may alternatively be used. For example, the order of execution of the blocks may be rearranged, changed, eliminated, and/or combined to perform the method 600. Further, because the method 600 is disclosed in connection with the components of FIGS. 1-5, some functions of those components will not be described in detail below.

Initially, at block 602, the tethering controller 130 determines whether one or more of the communication nodes 126 has received a RePA signal (also referred to as an instruction) from the mobile device 204. In response to the tethering controller 130 determining that a RePA signal has not been received from the mobile device 204, the method 600 remains at block 602. Otherwise, in response to the tethering controller 130 determining that a RePA signal has been received from the mobile device 204, the method 600 proceeds to block 604 at which the tethering controller 130 determines a distance between the mobile device 204 and the exterior surface 102 of the vehicle 100.

At block 606, the tethering controller 130 determines whether the mobile device 204 is within the tethering range 208 of the vehicle 100. For example, the tethering controller 130 determines whether the mobile device 204 is within the tethering range 208 by comparing the distance of the vehicle 100 to the mobile device 204 to a distance of the vehicle 100 to the outer boundary 306 of the tethering range 208. In such examples, the tethering controller 130 determines that the mobile device 204 is within the tethering range 208 responsive to identifying that the distance to the mobile device 204 is less than the distance to the outer boundary 306 of the tethering range 208. In response to the tethering range 208 determining that the mobile device 204 is not within the tethering range 208, the method 600 returns to block 602. Otherwise, in response to the tethering range 208 determining that the mobile device 204 is within the tethering range 208, the method 600 proceeds to block 608 at which the autonomy unit 128 performs remote parking of the vehicle 100.

At block 610, the tethering controller 130 determines whether the mobile device 204 is beyond a first threshold range (e.g., the threshold range 302 of FIG. 3) of the vehicle 100. In response to the tethering controller 130 determining that the mobile device 204 is not beyond the first threshold range, the method 600 returns to block 602. Otherwise, in response to the tethering controller 130 determining that the mobile device 204 is beyond the first threshold range, the method 600 proceeds to block 612.

At block 612, the tethering controller 130 determines whether the mobile device 204 is beyond a second threshold range (e.g., the threshold range 304 of FIG. 3) of the vehicle 100. In response to the tethering controller 130 determining that the mobile device 204 is not beyond the second threshold range, the method 600 proceeds to block 616. Otherwise, in response to the tethering controller 130 determining that the mobile device 204 is beyond the second threshold range, the method 600 proceeds to block 614.

At block 614, the tethering controller 130 determines whether the mobile device 204 is at the outer boundary 306 of the tethering range 208 of the vehicle 100. In response to the tethering controller 130 determining that the mobile device 204 is at the outer boundary 306, the method 600 proceeds to block 616. Further, in response to the tethering controller 130 determining that the mobile device 204 is at the outer boundary 306, the method 600 proceeds to block 616.

At block 616, the tethering controller 130 determines an audio alert that is to be emitted to the user 206 of the mobile device 204. For example, the tethering controller 130 determines to emit a first alert if the mobile device 204 is beyond the first threshold range and within the second threshold range, a second alert if the mobile device 204 is beyond the second threshold range and within the outer boundary 306, or a third alert if the mobile device 204 is at the outer boundary 306. In some examples, the alert selected by the tethering controller 130 varies based on the distance between the mobile device 204 and the exterior surface 102 of the vehicle 100. At block 618, the tethering controller 130 emits the alert determined at block 616 via a speaker of the vehicle 100. For example, the cabin speakers 112, the horn 114, the door-chirp speaker 116, and/or the audio actuator 118 coupled to the exterior surface 102 of the vehicle 100 emit the alert to the user 206 of the mobile device 204.

At block 620, the tethering controller 130 determines whether the speaker 408 of the mobile device 204 is to emit the alert to the user 206. In response to the tethering controller 130 determining that the mobile device 204 is not to emit the alert, the method 600 returns to block 602. Otherwise, in response to the tethering controller 130 determining that the mobile device 204 is to emit the alert, the method 600 proceeds to block 622. At block 622, the tethering controller 130 sends an alert signal to the mobile device 204 via one or more of the communication nodes 126. At block 624, the communication module 406 of the mobile device 204 receives the alert signal that was sent from the vehicle 100. At block 626, the speaker 408 of the mobile device 204 emits the alert to the user 206. At block 628, the tethering controller 130 of the vehicle 100 and/or the processor 402 of the mobile device 204 synchronize the alert that is emitted via one or more speakers of the vehicle 100 and the speaker 408 of the mobile device 204. For example, the vehicle 100 and/or the mobile device 204 includes a microphone that collects an audio signal of the alert emitted by the vehicle 100 and the mobile device 204. Based upon the audio signal, the tethering controller 130 adjusts the alert emitted by the one or more speakers of the vehicle 100 and/or the processor 402 of the mobile device 204 adjusts the alert emitted by the speaker 408 of the mobile device to synchronize the signal emitted by the vehicle 100 and the mobile device 204.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
an exterior surface;
a speaker;
a communication node for wireless communication with a mobile device;
a controller to:
receive, via the communication node, an instruction from the mobile device to perform remote parking;
emit a first alert, via the speaker, responsive to determining that the mobile device is beyond a first threshold range from the exterior surface when sending the instruction;
determine that the mobile device is beyond the first threshold range but within a second threshold range that is further from the vehicle than the first threshold range, the first threshold range and second threshold range both being within a tethering range; and
emit, via the speaker and based on the determination that the mobile device is beyond the first threshold range but within the second threshold range, a second alert, the second alert being different than the first alert; and
an autonomy unit configured to perform the remote parking responsive to the controller determining that the mobile device is within a tethering range from the exterior surface when sending the instruction, the tethering range being larger than the threshold range.

2. The vehicle of claim 1, wherein the autonomy unit is configured to perform the remote parking only when the mobile device is located outside of a vehicle cabin.

3. The vehicle of claim 1, whether the autonomy unit is configured to not perform the remote parking responsive to the controller determining that the mobile device is beyond the tethering range from the exterior surface when sending the instruction.

4. The vehicle of claim 1, wherein the controller determines a distance between the mobile device and the exterior surface via at least one of a received signal strength indicator, a time-of-flight, an angle-of-arrival, and dead reckoning of the instruction.

5. The vehicle of claim 1, wherein the controller increases at least one of an intensity and a frequency of the alert responsive to detecting an increase in a distance between the mobile device and the exterior surface.

6. The vehicle of claim 1, wherein the speaker includes a door-chirp speaker of a door that is configured to emit a chirp when the door becomes locked.

7. The vehicle of claim 1, wherein the speaker includes at least one of a cabin speaker and an audio actuator coupled to a window.

8. The vehicle of claim 7, further including sensors that detect an occupant presence within a vehicle cabin.

9. The vehicle of claim 8, wherein the controller prevents the at least one of the cabin speaker and the audio actuator from emitting the alert responsive to determining that an occupant is located within the vehicle cabin.

10. The vehicle of claim 1, wherein the controller sends an alert signal to the mobile device via the communication node to instruct the mobile device to emit the alert.

11. The vehicle of claim 1, wherein the controller emits a third alert, via the speaker, responsive to determining that the mobile device is along an outer boundary of the tethering range from the exterior surface when sending the instruction, the third alert being different than the first alert and the second alert.

12. The vehicle of claim 1, wherein the controller adjusts the alert to prevent a Doppler effect from affecting a sound of the alert heard by an operator.

13. A method comprising:
receiving, via a communication node of a vehicle, an instruction from a mobile device to perform remote parking of the vehicle;
determining, via a processor, whether the mobile device is within a tethering range from an exterior surface of the vehicle when sending the instruction;
determining, via the processor, whether the mobile device is beyond a threshold range from the exterior surface while sending the instruction, wherein the threshold range is smaller than the tethering range;
performing, via an autonomy unit of the vehicle, the remote parking responsive to determining that the mobile device is within the tethering range when sending the instruction;
emitting a first alert, via a speaker of the vehicle, responsive to determining the mobile device is beyond the threshold range when sending the instruction;
determining that the mobile device is beyond the first threshold range but within a second threshold range that is further from the vehicle than the first threshold range, the first threshold range and second threshold range both being within a tethering range; and
emitting, via the speaker and based on the determination that the mobile device is beyond the first threshold range but within the second threshold range, a second alert, the second alert being different than the first alert.

14. A system comprising:
a mobile device to send an instruction to perform remote parking; and a vehicle including:
an exterior surface;
a speaker;
a communication node;
a controller to:
receive the instruction via the communication node;
emit a first alert, via the speaker, responsive to determining the mobile device is beyond a first threshold range from the exterior surface when sending the instruction;
determine that the mobile device is beyond the first threshold range but within a second threshold range that is further from the vehicle than the first threshold range, the first threshold range and second threshold range both being within a tethering range; and
emit, via the speaker and based on the determination that the mobile device is beyond the first threshold range but within the second threshold range, a second alert, the second alert being different than the first alert; and
an autonomy unit to perform the remote parking responsive to the controller
determining that the mobile device is within a tethering range from the exterior surface when sending the instruction, the tethering range being larger than the threshold range.

15. The system of claim 14, wherein the mobile device includes:
a processor;
a communication module to:
send the instruction to the communication node of the vehicle; and
receive an alert signal from the communication node of the vehicle; and
a mobile device speaker to emit the alert responsive to the communication module receiving the alert signal.

16. The system of claim 15, wherein the speaker of the vehicle and the mobile device speaker are synchronized to emit the alert.

17. The system of claim 16, wherein at least one of the vehicle and the mobile device includes a microphone to facilitate synchronization of the alert emitted by the speaker of the vehicle and the mobile device speaker.

18. The system of claim 17, wherein at least one of the processor of the mobile device and the controller of the vehicle processes an audio signal collected via the microphone to reduce an effect of ambient noise on the synchronization of the alert emitted by the speaker and the mobile device speaker.

19. The method of claim 13, further including:
emitting a third alert, via the speaker, responsive to determining that the mobile device is along an outer boundary of the tethering range from the exterior surface when sending the instruction, the third alert being different than the alert and the second alert.

* * * * *